(12) United States Patent
Shen et al.

(10) Patent No.: US 12,167,464 B2
(45) Date of Patent: Dec. 10, 2024

(54) 2-STEP RANDOM ACCESS METHOD AND DEVICE FOR UNLICENSED BAND

(71) Applicant: VIVO MOBILE COMMUNICATION CO.,LTD., Guangdong (CN)

(72) Inventors: Xiaodong Shen, Guangdong (CN); Yitao Mo, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 376 days.

(21) Appl. No.: 17/666,784

(22) Filed: Feb. 8, 2022

(65) Prior Publication Data

US 2022/0167429 A1 May 26, 2022

Related U.S. Application Data

(63) Continuation of application No. PCT/CN2020/107126, filed on Aug. 5, 2020.

(30) Foreign Application Priority Data

Aug. 8, 2019 (CN) .......................... 201910731201.1

(51) Int. Cl.
*H04W 74/0833* (2024.01)
(52) U.S. Cl.
CPC ................. *H04W 74/0833* (2013.01)
(58) Field of Classification Search
None
See application file for complete search history.

(56) References Cited

U.S. PATENT DOCUMENTS

| 2013/0250911 | A1* | 9/2013 | Kwon | ............... | H04W 36/0055 |
| | | | | | 370/336 |
| 2019/0132882 | A1* | 5/2019 | Li | ..................... | H04W 74/0833 |
| 2019/0394805 | A1 | 12/2019 | Kim et al. | | |
| 2020/0267775 | A1 | 8/2020 | Wang et al. | | |
| 2022/0174749 | A1* | 6/2022 | Ohara | ............... | H04W 74/0833 |

(Continued)

FOREIGN PATENT DOCUMENTS

| CN | 109495977 A | 3/2019 |
| CN | 109756991 A | 5/2019 |
| CN | 110035555 A | 7/2019 |

(Continued)

OTHER PUBLICATIONS

Qualcomm Incorporated, "Other Considerations for Two-Step RACH", 3GPP TSG-RAN WG1 Meeting #97, R1-1907257, Reno, USA, May 13-May 17, 2019.

(Continued)

*Primary Examiner* — Lonnie V Sweet
(74) *Attorney, Agent, or Firm* — Price Heneveld LLP

(57) ABSTRACT

A 2-step random access method and device for an unlicensed band are provided. The method is executed by a terminal device and includes: determining, based on an LBT detection result, whether to send an msgA and whether to update a power ramping counter for the msgA, where the power ramping counter is used to determine transmission power for the msgA, and the msgA includes a PRACH and a PUSCH; and determining, based on a sending status of the msgA, whether to update a transmission counter for the msgA.

16 Claims, 2 Drawing Sheets

100

Determine, based on an LBT detection result, whether to send a msgA and whether to update a power ramping counter for the msgA — S102

Determine, based on a sending status of the msgA, whether to update a transmission counter for the msgA — S104

(56) References Cited

U.S. PATENT DOCUMENTS

2022/0201768 A1* 6/2022 Ohara ................ H04W 74/008
2022/0217783 A1* 7/2022 Liu ................... H04W 74/0833

FOREIGN PATENT DOCUMENTS

| CN | 115209562 A | 10/2022 |
| WO | 2017151187 A1 | 9/2017 |
| WO | 2018164478 A1 | 9/2018 |

OTHER PUBLICATIONS

Nokia, "2-step RACH Procedure Feature Lead Summary", 3GPP TSG RAN WG1 #97, RI-1907726, Reno, USA, May 13-May 17, 2019.

Nokia, "[Draft] LS Reply on 2-step RACH MsgA content and power control", 3GPP TSG-RAN WG1 #97, RI-1907935, Reno, USA, May 13-May 17, 2019.

ZTE, Sanechips, "Discussion on enhancement of initial access procedures for NR-U", 3GPP TSG RAN WG1 Meeting #96bis, R1-1903874, Apr. 8-12, 2019, Xi'an, China.

Nokia, Nokia Shanghai Bell, "Feature lead summary#2 on 2 step RACH procedures", 3GPP TSG RAN WG1 #97, R1-1907838, May 13-17, 2019, Reno, USA.

Interdigital, "Random access in NR-Unlicensed", 3GPP RAN WG2 Meeting #106, R2-1906402, Reno, USA, May 13-17, 2019.

Qualcomm Inc., "Further details on RACH for NR-U", 3GPP TSG-RAN2#104, R2-1818503, Spokane, WA, USA, Nov. 12-16, 2018.

Nokia, "LS Reply on 2-step RACH MsgA content and power control", 3GPP TSG-RAN WG1#97, R1-1907948, Reno, USA, May 13-17, 2019.

Huawei, "Discussion on 2-step RACH procedure", 3GPP TSG RAN WGi Meeting #97, RI-1906051, Reno, USA, May 13-May 17, 2019.

Nokia, "LS Reply on 2-step RACH MsgA content and power control", 3GPP TSG RAN WG2#107, R2-1908621, Prague, Czech Republic, Aug. 26-30, 2019.

Huawei, "timers and counters for two-steps RACH", 3GPP TSG-RAN WG2 Meeting #104, R2-1816604, Spokane, US, Nov. 12-16, 2018.

Oppo, "Enhancements of 4-steps RACH in NR-U and the corresponding TP", 3GPP TSG-RAN WG2 Meeting #104, R2-1816261, Spokane, USA, Nov. 12-16, 2018.

* cited by examiner

2-STEP RANDOM ACCESS METHOD AND DEVICE FOR UNLICENSED BAND

CROSS-REFERENCE TO RELATED APPLICATIONS

This application is a continuation application of PCT International Application No. PCT/CN2020/107126 filed on Aug. 5, 2020, which claims priority to Chinese Patent Application No. 201910731201.1, filed with the China National Intellectual Property Administration on Aug. 8, 2019 and entitled "2-STEP RANDOM ACCESS METHOD AND DEVICE FOR UNLICENSED BAND", which are incorporated in their entireties by reference herein.

TECHNICAL FIELD

Embodiments of this disclosure relate to the field of communications, and in particular, to a 2-step random access method and device for an unlicensed band.

BACKGROUND

An unlicensed band is one of effective ways to overcome shortage of spectrum resources in a mobile communications network. Extending new radio (NR) technology on licensed bands to unlicensed bands can improve capacity and performance of a system. NR has introduced the 2-step random access procedure (or referred to as 2-step RACH). However, how a terminal device initiates 2-step RACH on an unlicensed band is a technical problem that needs to be resolved urgently in related technology.

SUMMARY

Embodiments of this disclosure provide a 2-step random access method and device for an unlicensed band, to provide a solution to random access for an unlicensed band in an NR system.

According to a first aspect, a 2-step random access method for an unlicensed band is provided, where the method is performed by a terminal device, and the method includes:

determining, based on a listen-before-talk (LBT) detection result, whether to send an msgA and whether to update a power ramping counter for the msgA, where the power ramping counter is used to determine transmission power for the msgA, and the msgA includes a physical random access channel (PRACH) and a physical uplink shared channel PUSCH); and determining, based on a sending status of the msgA, whether to update a transmission counter for the msgA.

According to a second aspect, a terminal device is provided, where the terminal device includes:

a sending module, configured to determine, based on an LBT detection result, whether to send an msgA; and a processing module, configured to determine, based on the LBT detection result, whether to update a power ramping counter for the msgA, where the power ramping counter is used to determine transmission power for the msgA, and the msgA includes a PRACH and a PUSCH, where the processing module is further configured to determine, based on a sending status of the msgA, whether to update a transmission counter for the msgA.

According to a third aspect, a terminal device is provided, where the terminal device includes a processor, a memory, and a computer program stored in the memory and capable of running on the processor, where when the computer program is executed by the processor, the steps of the 2-step random access method for an unlicensed band according to the first aspect are implemented.

According to a fourth aspect, a computer-readable storage medium is provided, where the computer-readable storage medium stores a computer program, and when the computer program is executed by a processor, the steps of the 2-step random access method for an unlicensed band according to the first aspect are implemented.

In the embodiments of this disclosure, the terminal device determines, based on the LBT detection result on the unlicensed band, whether to send the msgA and whether to update the power ramping counter for the msgA, and determines, based on the sending status of the msgA, whether to update the transmission counter for the msgA. The embodiments of this disclosure provide a solution to the 2-step random access for the unlicensed band in the NR system, to improve utilization of spectrums in the NR system and improve communication efficiency.

BRIEF DESCRIPTION OF DRAWINGS

The accompanying drawings described herein are intended for a further understanding of this disclosure and constitute a part of this disclosure. Example embodiments of this disclosure and descriptions thereof are intended to explain this disclosure, and do not constitute any inappropriate limitation on this disclosure. In the accompanying drawings.

DESCRIPTION OF EMBODIMENTS

To make the purpose, technical solutions, and advantages of this disclosure clearer, the following describes the technical solutions of this disclosure clearly with reference to specific embodiments of this disclosure and corresponding accompanying drawings. Apparently, the described embodiments are merely some rather than all of the embodiments of this disclosure. All other embodiments obtained by a person of ordinary skill in the art based on the embodiments of this disclosure without creative efforts shall fall within the protection scope of this disclosure. "A and/or B" in the embodiments of this specification means at least one of A and B.

It should be understood that, the technical solutions in the embodiments of this disclosure may be applied to various communications systems, such as a long term evolution (LTE) system, an LTE frequency division duplex (FDD) system, an LTE time division duplex (TDD) system, universal mobile telecommunications system (UMTS), a worldwide interoperability for microwave access (WiMAX) communications system, a 5G system or in other words, a new radio (NR) system, or a later evolved communications system.

In the embodiments of this disclosure, a terminal device may include but is not limited to a mobile station (MS), a mobile terminal, a mobile phone, user equipment (UE), a handset, portable equipment, a vehicle, and the like. The terminal device may communicate with one or more core networks by using a radio access network (RAN). For example, the terminal device may be a mobile phone (or referred to as a "cellular" phone), or a computer having a wireless communication function. The terminal device may alternatively be a portable, pocket-sized, handheld, computer built-in, or in-vehicle mobile apparatus.

Figure 1:
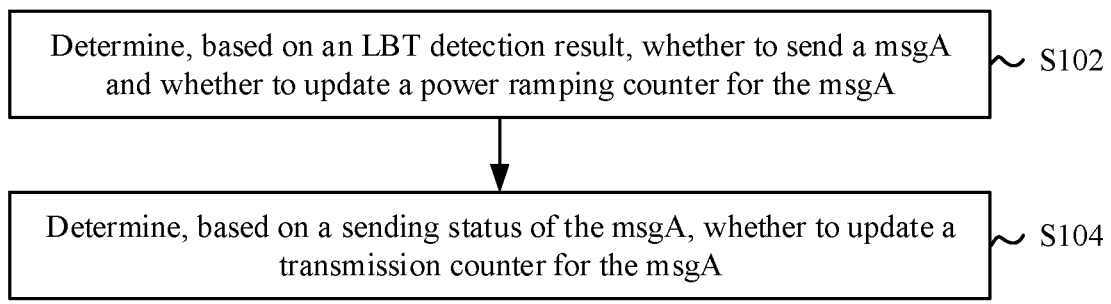
FIG. 1 is a schematic flowchart of a 2-step random access method for an unlicensed band according to an embodiment of this disclosure.

As shown in FIG. 1, an embodiment of this disclosure provides a 2-step random access method 100 for an unlicensed band. The method can be performed by a terminal device and includes the following steps.

S102. Determine, based on an LBT detection result, whether to send an msgA and whether to update a power ramping counter for the msgA.

Before sending the msgA on an unlicensed band in NR, the terminal device needs to perform LBT. Specifically, the terminal device can perform clear channel assess (CCA) or extended clear channel assess (eCCA) on an unlicensed band to monitor a channel, that is, to perform energy detection (ED). When energy is less than a specified threshold, the channel is determined to be clear, that is, the channel passes LBT detection and then the msgA can start being sent; or when the energy is greater than or equal to the threshold, the channel is determined to be busy, that is, the channel fails LBT detection and the msgA cannot be sent.

The msgA in this step includes a PRACH and a PUSCH. Before this step, LBT detection can be performed on the PRACH and the PUSCH separately. This step can be implemented as follows (certainly, this is not limited to the following example):

If the PRACH passes LBT detection and other additional conditions are met, the PRACH can be sent; or conversely, if the PRACH fails LBT detection and/or the additional conditions are not met, the PRACH is not sent; and if the PUSCH passes LBT detection and other additional conditions are met, the PUSCH can be sent; or conversely, if the PUSCH fails LBT detection and/or the additional conditions are not met, the PUSCH is not sent.

Whether to update the power ramping counter for the msgA mentioned in this step includes two cases: 1. Update a count on the power ramping counter, that is, add 1 (plus 1) to the count on the power ramping counter; 2. keep the count on the power ramping counter unchanged, that is, suspend the count on the power ramping counter.

Certainly, adding 1 to the count on the power ramping counter is a simplest implementation, and another counting unit such as 2 or 3 can also be added to the count on the power ramping counter. A specific to-be-added value can be specified in a protocol in advance.

In this embodiment, the PRACH and the PUSCH can share one power ramping counter, or certainly, can use different power ramping counters.

If the PRACH and the PUSCH shares one power ramping counter, this step is implemented as follows:

If at least one of the PRACH and the PUSCH passes LBT detection, an operation of adding 1 can be performed on the shared power ramping counter; or if both the PRACH and the PUSCH fail LBT detection, the shared power ramping counter can be suspended.

For another example, if the PRACH and the PUSCH use different power ramping counters, this step is implemented as follows:

If the PRACH passes LBT detection, an operation of adding 1 is performed on the power ramping counter for the PRACH; or if the PRACH fails LBT detection, the power ramping counter for the PRACH is suspended; and if the PUSCH passes LBT detection, an operation of adding 1 is performed on the power ramping counter for the PUSCH; or if the PUSCH fails LBT detection, the power ramping counter for the PUSCH is suspended.

S104. Determine, based on a sending status of the msgA, whether to update a transmission counter for the msgA.

The sending status of the msgA mentioned in the embodiments of this specification includes whether to send the PRACH and whether to send the PUSCH, or certainly, can also include some cases after the msgA is sent, for example, whether an msgB receiving window expires, whether contention resolution succeeds, or the like.

Generally, the msgB receiving window is initiated only after the msgA is sent, and whether contention resolution succeeds can be determined only after the msgA (for example, the PUSCH) is sent. Therefore, the sending status of the msgA mentioned in the embodiments of this specification includes two cases: the msgB receiving window expires and contention resolution fails.

Whether to update the transmission counter for the msgA mentioned in this step includes two cases: 1. Update a count on the transmission counter, that is, add 1 to the count on the transmission counter; 2. keep the count on the transmission counter unchanged, that is, suspend the count on the transmission counter.

As mentioned above, the msgA includes the PRACH and the PUSCH. In this embodiment, the PRACH and the PUSCH can share one transmission counter, or can use different transmission counters.

Specifically, for example, when the PRACH and the PUSCH share one transmission counter:

if at least one of the PRACH and the PUSCH is sent, an operation of adding 1 can be performed on the shared transmission counter; or if neither the PRACH nor the PUSCH is sent, the shared transmission counter can be suspended.

For another example, when the PRACH and the PUSCH use different transmission counters:

if the PRACH is sent, an operation of adding 1 can be performed on the transmission counter for the PRACH; or if the PRACH is not sent, the transmission counter for the PRACH is suspended; and if the PUSCH is sent, an operation of adding 1 can be performed on the transmission counter for the PUSCH; or if the PUSCH is not sent, the transmission counter for the PUSCH is suspended.

Based on the 2-step random access method for the unlicensed band provided in this embodiment of this disclosure, the terminal device determines, based on the LBT detection result on the unlicensed band, whether to send the msgA and whether to update the power ramping counter for the msgA, and determines, based on the sending status of the msgA, whether to update the transmission counter for the msgA. This embodiment of this disclosure provides a solution to the 2-step random access for the unlicensed band in the NR system, to improve utilization of spectrums in the NR system and improve communication efficiency.

The power ramping counter mentioned in the embodiments of this specification can be used to determine transmission power for the msgA. The following uses an example in which the PRACH and the PUSCH use different power ramping counters, to briefly describe a process of determining transmission power for the PRACH.

Transmission power for a PRACH preamble can be calculated according to the following formula:

preambleReceivedTargetPower+DELTA_PRE-
AMBLE+(PREAMBLE_POWER_RAMPING-
_COUNTER−1)×PREAMBLE_POWER-
_RAMPING_STEP.

In the foregoing formula, preambleReceivedTargetPower is target received power for the PRACH preamble; DELTA_PREAMBLE is a downlink path loss; PREAMBLE_POWER_RAMPING_COUNTER is a count on the power ramping counter for the PRACH, and has an initial value of 1; and PREAMBLE_POWER_RAMPING_STEP is a power ramping range.

The foregoing uses the example in which the PRACH and the PUSCH use different power ramping counters, to describe how to calculate the transmission power for the PRACH. Certainly, how to calculate transmission power for the PUSCH when the PRACH and the PUSCH use different power ramping counters and how to calculate transmission power for the PRACH and the PUSCH when the PRACH and the PUSCH share one power ramping counter are similar to the foregoing calculation process. Details are not described herein.

The transmission counter and the power ramping counter for the msgA mentioned in the foregoing embodiment include the following cases:

Optionally, the PRACH for the msgA and the PUSCH for the msgA share one transmission counter and one power ramping counter;
  the PRACH for the msgA and the PUSCH for the msgA use different transmission counters, but share one power ramping counter;
  the PRACH for the msgA and the PUSCH for the msgA share one transmission counter, but use different power ramping counters; or
  the PRACH for the msgA and the PUSCH for the msgA use different transmission counters and different power ramping counters.

With reference to several specific embodiments, the following describes in detail the 2-step random access method for the unlicensed band provided in the embodiments of this disclosure. All the following embodiments describe a 2-step RACH for an unlicensed band.

Embodiment 1

In Embodiment 1, the PRACH for the msgA and the PUSCH for the msgA share one transmission counter and one power ramping counter. Embodiment 1 is divided into two sub-embodiments for description.

Sub-Embodiment 1

If the PRACH for the msgA fails LBT detection and the PUSCH for the msgA fails LBT detection, a physical layer sends an LBT failure indication to a higher layer, to indicate that the PRACH and the PUSCH cannot be sent due to the LBT failure.

After receiving the foregoing LBT failure indication, the higher layer directly suspends the foregoing shared power ramping counter.

In this embodiment, a terminal device does not send the PRACH or the PUSCH. The terminal device considers that the MsgB is not successfully received and directly suspends a transmission counter.

It should be noted that the msgB mentioned in the embodiments of this specification may specifically be a message sent by a network device to the terminal device in a 2-step RACH, and may include at least one of a random access response message and a contention resolution identifier.

Optionally, the terminal device may further determine, based on the number of LBT detection failures of the PRACH and/or the PUSCH, whether to terminate a current random access procedure.

If yes, that is, it is determined that the current random access procedure is to be terminated, LBT failure recovery can be performed; or
  if no, that is, the current random access procedure is not to be terminated, preparation for the next random access continues. For example, a resource selection procedure in the next random access procedure is performed, and the resource mentioned herein includes at least one of the following: a random access channel type (RACH type) such as a 2-step RACH or a 4-step RACH, an uplink carrier (UL carrier), a bandwidth part (BWP), a synchronization signal block SSB (SS/PBCH block), a random access preamble group, a random access preamble, a random access channel occasion (RO), a PUSCH configuration for the msgA, and the like.

Sub-Embodiment 2

If at least one of the PRACH and the PUSCH passes LBT detection, a physical layer sends an LBT indication to a higher layer. The LBT indication includes at least one of an LBT success indication of the PRACH and an LBT success indication of the PUSCH.

After the higher layer receives the LBT indication from the physical layer, if an additional condition is met, the higher layer performs an operation of adding 1 on the power ramping counter. For example, the additional condition herein includes: a count on the power ramping counter does not reach a maximum value, and so on.

Optionally, in this embodiment, if the higher layer receives the LBT success indication of the PRACH for the msgA, it may prepare to send the PRACH for the msgA.

Optionally, in this embodiment, if the higher layer receives the LBT success indication of the PUSCH for the msgA and also receives an uplink grant for the PUSCH for the msgA, it may prepare to send the PUSCH for the msgA.

In this embodiment, after at least one of the PRACH and the PUSCH is sent, the terminal device can further initiate an msgB receiving window.

In this embodiment, if the msgB receiving window expires and/or contention resolution fails, an operation of adding 1 is performed on the foregoing shared transmission counter.

Embodiment 2

In Embodiment 2, the PRACH for the msgA and the PUSCH for the msgA use different transmission counters, but share one power ramping counter. Embodiment 2 is divided into four sub-embodiments for description.

Sub-Embodiment 1

If the PRACH for the msgA fails LBT detection, neither the PRACH nor the PUSCH is to be sent, regardless of whether the PUSCH for the msgA passes or fails LBT detection.

Specifically, the physical layer sends an LBT indication to a higher layer. The LBT indication includes an LBT failure indication of the PRACH, and certainly, can also include an LBT failure indication of the PUSCH or an LBT success indication of the PUSCH.

After receiving the foregoing LBT indication, the higher layer directly suspends the power ramping counter.

In this embodiment, the terminal device considers that the msgB is not successfully received, the transmission counter for the PRACH is directly suspended; and the transmission counter for the PUSCH is suspended.

Optionally, the terminal device may further determine, based on the number of LBT detection failures of the PRACH and/or the PUSCH, whether to terminate a current random access procedure:

If yes, that is, it is determined that the current random access procedure is to be terminated, LBT failure recovery can be performed; or if no, that is, the current random access procedure is not to be terminated, preparation for the next random access continues, for example, a resource selection procedure in the next random access procedure is performed.

The determining, based on the number of LBT detection failures of the PRACH and/or the PUSCH, whether to terminate a current random access procedure specifically includes: for example, the current random access procedure can be terminated if the number of LBT detection failures of the PRACH reaches a preset threshold, the number of LBT detection failures of the PUSCH reaches a preset threshold, or a larger one of the number of LBT detection failures of the PRACH and the number of LBT detection failures of the PUSCH reaches a preset threshold; or for another example, the current random access procedure may not be terminated if the number of LBT detection failures of the PRACH does not reach a preset threshold and the number of LBT detection failures of the PUSCH reaches a preset threshold.

Sub-Embodiment 2

The PRACH for the msgA passes LBT detection, but the PUSCH for the msgA fails LBT detection.

In this embodiment, the physical layer sends an LBT indication to a higher layer. The LBT indication can include an LBT success indication of the PRACH and an LBT failure indication of the PUSCH.

After the higher layer receives the LBT indication, if an additional condition is met, an operation of adding 1 can be performed on the shared power ramping counter.

Optionally, when the higher layer receives the LBT success indication of the PRACH, it may prepare to send the PRACH for the msgA; or when the higher layer receives the LBT failure indication of the PUSCH, it does not send the PUSCH for the msgA.

Optionally, after sending the PRACH, the terminal device can further initiate an msgB or msg2 receiving window.

The msg2 receiving window mentioned in the embodiments of this specification may be a time window for receiving a random access response message, and may be specifically an RAR time window used in the 4-step RACH.

For a terminal device in a connected state, if the PUSCH for the msgA includes a cell-radio network temporary identifier (C-RNTI) media access control control element MAC CE, during operation of the msgB or msg2 receiving window, the terminal device can only monitor a physical downlink control channel (PDCCH) scrambled by the random access-radio network transmission identifier (RA-RNTI), but does not monitor a PDCCH scrambled by the C-RNTI, or ignores the PDCCH scrambled by the C-RNTI.

In an embodiment, if the msgB or msg2 receiving window expires and/or contention resolution fails, an operation of adding 1 is performed on the transmission counter for the PRACH, and the transmission counter for the PUSCH is suspended.

In another embodiment, in a case that the terminal device falls back to the 4-step random access procedure and sends the PUSCH, if the contention resolution fails, an operation of adding 1 is performed on the transmission counter for the PRACH, and an operation of adding 1 is performed on the transmission counter for the PUSCH.

Optionally, in this embodiment, if at least one of the following is met, the physical layer sends indication information to a higher layer, where the indication information is used to indicate a random access problem:

a count on the transmission counter for the PRACH reaches a first threshold;

a count on the transmission counter for the PUSCH reaches a second threshold; or a larger one of a count on the transmission counter for the PRACH and a count on the transmission counter for the PUSCH reaches a third threshold.

Sub-Embodiment 3

The PRACH for the msgA fails LBT detection, but the PUSCH for the msgA passes LBT detection.

In this embodiment, the physical layer sends an LBT indication to a higher layer. The LBT indication includes an LBT failure indication of the PRACH and an LBT success indication of the PUSCH.

After the higher layer receives the LBT indication, if an additional condition is met, an operation of adding 1 can be performed on the shared power ramping counter.

Optionally, if the higher layer receives the LBT success indication of the PUSCH and an uplink grant for the PUSCH for the msgA, it may prepare to send the PUSCH for the msgA. If the higher layer receives the LBT failure indication of the PRACH, it does not send the PRACH for the msgA.

Optionally, after sending the PUSCH for the msgA, the terminal device can further initiate an msgB receiving window.

If the msgB receiving window expires and/or contention resolution fails, the transmission counter for the PRACH is suspended, and an operation of adding 1 is performed on the transmission counter for the PUSCH.

Optionally, in this embodiment, if at least one of the following is met, the physical layer sends indication information to a higher layer, where the indication information is used to indicate a random access problem:

a count on the transmission counter for the PRACH reaches a first threshold;

a count on the transmission counter for the PUSCH reaches a second threshold; or a larger one of a count on the transmission counter for the PRACH and a count on the transmission counter for the PUSCH reaches a third threshold.

Sub-Embodiment 4

The PRACH for the msgA passes LBT detection, and the PUSCH for the msgA passes LBT detection.

The physical layer sends an LBT indication to a higher layer. The LBT indication includes an LBT success indication of the PRACH and an LBT success indication of the PUSCH.

After the higher layer receives the LBT indication from the physical layer, if an additional condition is met, the higher layer performs an operation of adding 1 on the power ramping counter. For example, the additional condition herein includes: a count on the power ramping counter does not reach a maximum value, and so on.

Optionally, in this embodiment, if the higher layer receives the LBT success indication of the PRACH for the msgA, it may prepare to send the PRACH for the msgA.

Optionally, in this embodiment, if the higher layer receives the LBT success indication of the PUSCH for the msgA and also receives an uplink grant for the PUSCH for the msgA, it may prepare to send the PUSCH for the msgA.

In this embodiment, after the PRACH and the PUSCH are sent, the terminal device can further initiate an msgB receiving window.

In this embodiment, if the msgB receiving window expires and/or contention resolution fails, an operation of adding 1 is performed on the transmission counter for the PRACH, and an operation of adding 1 is performed on the transmission counter for the PUSCH.

Optionally, in this embodiment, if at least one of the following is met, the physical layer sends indication information to a higher layer, where the indication information is used to indicate a random access problem:
  a count on the transmission counter for the PRACH reaches a first threshold;
  a count on the transmission counter for the PUSCH reaches a second threshold; or
  a larger one of a count on the transmission counter for the PRACH and a count on the transmission counter for the PUSCH reaches a third threshold.

Embodiment 3

In Embodiment 3, the PRACH for the msgA and the PUSCH for the msgA share one transmission counter but use different power ramping counters. Embodiment 3 is divided into four sub-embodiments for description.

Sub-Embodiment 1

If the PRACH for the msgA fails LBT detection, neither the PRACH nor the PUSCH is to be sent, regardless of whether the PUSCH for the msgA passes or fails LBT detection.

Specifically, the physical layer sends an LBT indication to a higher layer. The LBT indication includes an LBT failure indication of the PRACH, and certainly, can also include an LBT failure indication of the PUSCH or an LBT success indication of the PUSCH.

After receiving the LBT failure indication of the PRACH, the higher layer directly suspends the power ramping counter for the PRACH; or after receiving the LBT failure indication of the PUSCH or the LBT success indication of the PUSCH, the higher layer suspends the power ramping counter for the PUSCH.

In this embodiment, the terminal device considers that the msgB is not successfully received, and directly suspends the shared transmission counter.

Optionally, the terminal device may further determine, based on the number of LBT detection failures of the PRACH and/or the PUSCH, whether to terminate a current random access procedure.

If yes, that is, it is determined that the current random access procedure is to be terminated, LBT failure recovery can be performed; or if no, that is, the current random access procedure is not to be terminated, preparation for the next random access continues, for example, a resource selection procedure in the next random access procedure is performed.

Sub-Embodiment 2

The PRACH for the msgA passes LBT detection, but the PUSCH for the msgA fails LBT detection.

In this embodiment, the physical layer sends an LBT indication to a higher layer. The LBT indication includes an LBT success indication of the PRACH and an LBT failure indication of the PUSCH.

After the higher layer receives the LBT success indication of the PRACH, if an additional condition is met, an operation of adding 1 can be performed on the power ramping counter for the PRACH; or after the higher layer receives the LBT failure indication of the PUSCH, the power ramping counter for the PUSCH is suspended.

Optionally, when the higher layer receives the LBT success indication of the PRACH, it may prepare to send the PRACH for the msgA; or when the higher layer receives the LBT failure indication of the PUSCH, it does not send the PUSCH for the msgA.

Optionally, after sending the PRACH, the terminal device can further initiate an msgB or msg2 receiving window.

If the PUSCH for the msgA includes a C-RNTI MAC CE, during operation of the msgB or msg2 receiving window, the terminal device can only monitor a PDCCH scrambled by the RA-RNTI, but does not monitor a PDCCH scrambled by the C-RNTI, or in other words, ignores the PDCCH scrambled by the C-RNTI.

If the msgB or msg2 receiving window expires and/or contention resolution fails, an operation of adding 1 is performed on the shared transmission counter. Certainly, in this embodiment, the terminal device can fall back to the 4-step random access procedure and has sent the PUSCH.

Sub-Embodiment 3

The PRACH for the msgA fails LBT detection, but the PUSCH for the msgA passes LBT detection.

In this embodiment, the physical layer sends an LBT indication to a higher layer. The LBT indication includes an LBT failure indication of the PRACH and an LBT success indication of the PUSCH.

After the higher layer receives the LBT failure indication of the PRACH, the power ramping counter for the PRACH can be suspended; or after the higher layer receives the LBT success indication of the PUSCH, if an additional condition is met, an operation of adding 1 can be performed on the power ramping counter for the PUSCH.

Optionally, if the higher layer receives the LBT success indication of the PUSCH and an uplink grant for the PUSCH for the msgA, it may prepare to send the PUSCH for the msgA. If the higher layer receives the LBT failure indication of the PRACH, it does not send the PRACH for the msgA.

Optionally, after sending the PUSCH for the msgA, the terminal device can further initiate an msgB receiving window.

If the msgB receiving window expires and/or contention resolution fails, an operation of adding 1 is performed on the shared transmission counter.

Sub-Embodiment 4

The PRACH for the msgA passes LBT detection, and the PUSCH for the msgA passes LBT detection.

The physical layer sends an LBT indication to a higher layer. The LBT indication includes an LBT success indication of the PRACH and an LBT success indication of the PUSCH.

After the higher layer receives the LBT indication from the physical layer, if an additional condition is met, the higher layer performs an operation of adding 1 on the power ramping counter for the PRACH, and performs an operation of adding 1 on the power ramping counter for the PUSCH.

Optionally, in this embodiment, if the higher layer receives the LBT success indication of the PRACH for the msgA, it may prepare to send the PRACH for the msgA.

Optionally, in this embodiment, if the higher layer receives the LBT success indication of the PUSCH for the msgA and also receives an uplink grant for the PUSCH for the msgA, it may prepare to send the PUSCH for the msgA.

In this embodiment, after the PRACH and the PUSCH are sent, the terminal device can further initiate an msgB receiving window.

In this embodiment, if the msgB receiving window expires and/or contention resolution fails, an operation of adding 1 is performed on the transmission counter for the PRACH, and an operation of adding 1 is performed on the transmission counter for the PUSCH.

Embodiment 4

In Embodiment 4, the PRACH for the msgA and the PUSCH for the msgA use different transmission counters and different power ramping counters. Embodiment 4 is divided into five sub-embodiments for description.

Sub-Embodiment 1

If the PRACH for the msgA fails LBT detection, neither the PRACH nor the PUSCH is to be sent, regardless of whether the PUSCH for the msgA passes or fails LBT detection.

Specifically, the physical layer sends an LBT indication to a higher layer. The LBT indication includes an LBT failure indication of the PRACH, and certainly, can also include an LBT failure indication of the PUSCH or an LBT success indication of the PUSCH.

After receiving the LBT failure indication of the PRACH, the higher layer directly suspends the power ramping counter for the PRACH; or after receiving the LBT failure indication of the PUSCH or the LBT success indication of the PUSCH, the higher layer suspends the power ramping counter for the PUSCH.

In this embodiment, the terminal device considers that the msgB is not successfully received, the transmission counter for the PRACH is directly suspended; and the transmission counter for the PUSCH is suspended.

Optionally, the terminal device may further determine, based on the number of LBT detection failures of the PRACH and/or the PUSCH, whether to terminate a current random access procedure.

If yes, that is, it is determined that the current random access procedure is to be terminated, LBT failure recovery can be performed; or if no, that is, the current random access procedure is not to be terminated, preparation for the next random access continues, for example, a resource selection procedure in the next random access procedure is performed.

Sub-Embodiment 2

The PRACH for the msgA passes LBT detection, but the PUSCH for the msgA fails LBT detection.

In this embodiment, the physical layer sends an LBT indication to a higher layer. The LBT indication includes an LBT success indication of the PRACH and an LBT failure indication of the PUSCH.

After the higher layer receives the LBT success indication of the PRACH, if an additional condition is met, an operation of adding 1 can be performed on the power ramping counter for the PRACH; or after the higher layer receives the LBT failure indication of the PUSCH, the power ramping counter for the PUSCH is suspended.

Optionally, when the higher layer receives the LBT success indication of the PRACH, it may prepare to send the PRACH for the msgA; or when the higher layer receives the LBT failure indication of the PUSCH, it does not send the PUSCH for the msgA.

Optionally, after sending the PRACH, the terminal device can further initiate an msgB or msg2 receiving window.

If the PUSCH for the msgA includes a C-RNTI MAC CE, during operation of the msgB or msg2 receiving window, the terminal device can only monitor a PDCCH scrambled by the RA-RNTI, but does not monitor a PDCCH scrambled by the C-RNTI, or in other words, ignores the PDCCH scrambled by the C-RNTI.

In an embodiment, if the msgB or msg2 receiving window expires and/or contention resolution fails, an operation of adding 1 is performed on the transmission counter for the PRACH, and the transmission counter for the PUSCH is suspended.

In another embodiment, in a case that the terminal device falls back to the 4-step random access procedure and sends the PUSCH, if the contention resolution fails, an operation of adding 1 is performed on the transmission counter for the PRACH, and an operation of adding 1 is performed on the transmission counter for the PUSCH.

Optionally, in this embodiment, if at least one of the following is met, the physical layer sends indication information to a higher layer, where the indication information is used to indicate a random access problem:
 a count on the transmission counter for the PRACH reaches a first threshold;
 a count on the transmission counter for the PUSCH reaches a second threshold; or
 a larger one of a count on the transmission counter for the PRACH and a count on the transmission counter for the PUSCH reaches a third threshold.

Sub-Embodiment 3

The PRACH for the msgA passes LBT detection, but the PUSCH for the msgA fails LBT detection.

In this embodiment, the physical layer sends an LBT indication to a higher layer. The LBT indication includes an LBT success indication of the PRACH and an LBT failure indication of the PUSCH.

After the higher layer receives the LBT success indication of the PRACH, if an additional condition is met, an operation of adding 1 can be performed on the power ramping counter for the PRACH; or after the higher layer receives the LBT failure indication of the PUSCH, an operation of adding 1 can also be performed on the power ramping counter for the PUSCH.

Optionally, when the higher layer receives the LBT success indication of the PRACH, it may prepare to send the PRACH for the msgA; or when the higher layer receives the LBT failure indication of the PUSCH, it does not send the PUSCH for the msgA.

Optionally, after sending the PRACH, the terminal device can further initiate an msgB or msg2 receiving window.

If the PUSCH for the msgA includes a C-RNTI MAC CE, during operation of the msgB or msg2 receiving window, the terminal device can only monitor a PDCCH scrambled by the RA-RNTI, but does not monitor a PDCCH scrambled by the C-RNTI, or in other words, ignores the PDCCH scrambled by the C-RNTI.

In an embodiment, if the msgB or msg2 receiving window expires and/or contention resolution fails, an operation of adding 1 is performed on the transmission counter for the PRACH, and the transmission counter for the PUSCH is suspended.

In another embodiment, in a case that the terminal device falls back to the 4-step random access procedure and sends the PUSCH, if the contention resolution fails, an operation of adding 1 is performed on the transmission counter for the PRACH, and an operation of adding 1 is performed on the transmission counter for the PUSCH.

Optionally, in this embodiment, if at least one of the following is met, the physical layer sends indication information to a higher layer, where the indication information is used to indicate a random access problem:
 a count on the transmission counter for the PRACH reaches a first threshold;
 a count on the transmission counter for the PUSCH reaches a second threshold; or
 a larger one of a count on the transmission counter for the PRACH and a count on the transmission counter for the PUSCH reaches a third threshold.

Sub-Embodiment 4

The PRACH for the msgA fails LBT detection, but the PUSCH for the msgA passes LBT detection.

In this embodiment, the physical layer sends an LBT indication to a higher layer. The LBT indication includes an LBT failure indication of the PRACH and an LBT success indication of the PUSCH.

After the higher layer receives the LBT failure indication of the PRACH, the power ramping counter for the PRACH can be suspended; or if the higher layer receives the LBT success indication of the PUSCH, and an additional condition is met, an operation of adding 1 can be performed on the power ramping counter for the PUSCH.

Optionally, if the higher layer receives the LBT success indication of the PUSCH and an uplink grant for the PUSCH for the msgA, it may prepare to send the PUSCH for the msgA. If the higher layer receives the LBT failure indication of the PRACH, it does not send the PRACH for the msgA.

Optionally, after sending the PUSCH for the msgA, the terminal device can further initiate an msgB receiving window.

If the msgB receiving window expires and/or contention resolution fails, the transmission counter for the PRACH is suspended, and an operation of adding 1 is performed on the transmission counter for the PUSCH.

Optionally, in this embodiment, if at least one of the following is met, the physical layer sends indication information to a higher layer, where the indication information is used to indicate a random access problem:
 a count on the transmission counter for the PRACH reaches a first threshold;
 a count on the transmission counter for the PUSCH reaches a second threshold; or
 a larger one of a count on the transmission counter for the PRACH and a count on the transmission counter for the PUSCH reaches a third threshold.

Sub-Embodiment 5

The PRACH for the msgA passes LBT detection, and the PUSCH for the msgA passes LBT detection.

The physical layer sends an LBT indication to a higher layer. The LBT indication includes an LBT success indication of the PRACH and an LBT success indication of the PUSCH.

After the higher layer receives the LBT success indication of the PRACH from the physical layer, if an additional condition is met, the higher layer performs an operation of adding 1 on the power ramping counter for the PRACH. For example, the additional condition herein includes: a count on the power ramping counter for the PRACH does not reach a maximum value, and so on.

After the higher layer receives the LBT success indication of the PUSCH from the physical layer, if an additional condition is met, the higher layer performs an operation of adding 1 on the power ramping counter for the PUSCH. For example, the additional condition herein includes: a count on the power ramping counter for the PUSCH does not reach a maximum value, and so on.

Optionally, in this embodiment, if the higher layer receives the LBT success indication of the PRACH for the msgA, it may prepare to send the PRACH for the msgA.

Optionally, in this embodiment, if the higher layer receives the LBT success indication of the PUSCH for the msgA and also receives an uplink grant for the PUSCH for the msgA, it may prepare to send the PUSCH for the msgA.

In this embodiment, after the PRACH and the PUSCH are sent, the terminal device can further initiate an msgB receiving window.

In this embodiment, if the msgB receiving window expires and/or contention resolution fails, an operation of adding 1 is performed on the transmission counter for the PRACH, and an operation of adding 1 is performed on the transmission counter for the PUSCH.

Optionally, in this embodiment, if at least one of the following is met, the physical layer sends indication information to a higher layer, where the indication information is used to indicate a random access problem:
 a count on the transmission counter for the PRACH reaches a first threshold;
 a count on the transmission counter for the PUSCH reaches a second threshold; or
 a larger one of a count on the transmission counter for the PRACH and a count on the transmission counter for the PUSCH reaches a third threshold.

The 2-step random access method for an unlicensed band according to an embodiment of this disclosure is described above in detail with reference to FIG. 1 and specific embodiments. A terminal device according to the embodiments of this disclosure is described below in detail with reference to FIG. 2.

Figure 2:
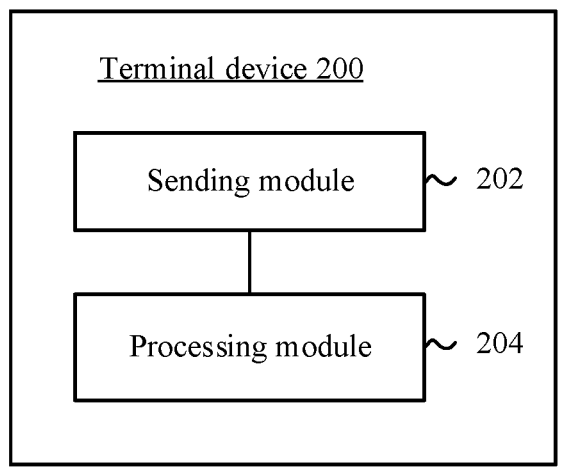
FIG. 2 is a schematic structural diagram of a terminal device according to an embodiment of this disclosure.

FIG. 2 is a schematic structural diagram of a terminal device according to an embodiment of this disclosure. As shown in FIG. 2, the terminal device 200 includes:
 a sending module 202, configured to determine, based on an LBT detection result, whether to send an msgA; and
 a processing module 204, configured to determine, based on the LBT detection result, whether to update a power ramping counter for the msgA, where the power ramping counter is used to determine transmission power for the msgA, and the msgA includes a PRACH and a PUSCH, where the processing module 204 may be further configured to determine, based on a sending status of the msgA, whether to update a transmission counter for the msgA.

In this embodiment of this disclosure, the terminal device determines, based on the LBT detection result on the unlicensed band, whether to send the msgA and whether to update the power ramping counter for the msgA, and determines, based on the sending status of the msgA, whether to update the transmission counter for the msgA. This embodiment of this disclosure provides a solution to the 2-step random access for the unlicensed band in the NR system, to improve utilization of spectrums in the NR system and improve communication efficiency.

Optionally, in an embodiment, the transmission counter for the msgA includes the transmission counter shared by the PRACH and the PUSCH, and the power ramping counter for the msgA includes the power ramping counter shared by the PRACH and the PUSCH;

the PRACH and the PUSCH use different transmission counters, and the power ramping counter for the msgA includes the power ramping counter shared by the PRACH and the PUSCH;

the transmission counter for the msgA includes the transmission counter shared by the PRACH and the PUSCH, but different power ramping counters are used; or the PRACH and the PUSCH use different transmission counters and different power ramping counters.

Optionally, in an embodiment, the transmission counter for the msgA includes the transmission counter shared by the PRACH and the PUSCH, and the power ramping counter for the msgA includes the power ramping counter shared by the PRACH and the PUSCH. The sending module 202 may be configured to: if the PRACH fails LBT detection and the PUSCH fails LBT detection, skip sending the PRACH and the PUSCH.

The processing module 204 may be configured to suspend the power ramping counter and the transmission counter.

Optionally, in an embodiment, the transmission counter for the msgA includes the transmission counter shared by the PRACH and the PUSCH, and the power ramping counter for the msgA includes the power ramping counter shared by the PRACH and the PUSCH. The processing module 204 may be further configured to:

if the PRACH fails LBT detection and the PUSCH fails LBT detection, determine, based on the number of LBT detection failures of the PRACH and/or the PUSCH, whether to terminate a current random access procedure; and if it is determined that the current random access procedure is to be terminated, perform LBT failure recovery.

Optionally, in an embodiment, the transmission counter for the msgA includes the transmission counter shared by the PRACH and the PUSCH, and the power ramping counter for the msgA includes the power ramping counter shared by the PRACH and the PUSCH. The processing module 204 may be further configured to:

if at least one of the PRACH and the PUSCH passes LBT detection, perform an operation of adding 1 on the power ramping counter.

Optionally, in an embodiment, the sending module 202 may be configured to: if the PUSCH passes LBT detection, send the PUSCH and initiate an msgB receiving window.

The processing module 204 may be configured to: if the msgB receiving window expires and/or contention resolution fails, perform an operation of adding 1 on the transmission counter.

Optionally, in an embodiment, the PRACH and the PUSCH use different transmission counters, and the power ramping counter for the msgA includes the power ramping counter shared by the PRACH and the PUSCH. The sending module 202 may be configured to: if the PRACH fails LBT detection, skip sending the PRACH and the PUSCH.

The processing module 204 may be configured to suspend the power ramping counter, suspend the transmission counter for the PRACH, and suspend an operation of adding 1 on the transmission counter for the PUSCH.

Optionally, in an embodiment, the PRACH and the PUSCH use different transmission counters, and the power ramping counter for the msgA includes the power ramping counter shared by the PRACH and the PUSCH. The processing module 204 may be configured to:

if the PRACH fails LBT detection, determine, based on the number of LBT detection failures of the PRACH and/or the PUSCH, whether to terminate a current random access procedure; and if it is determined that the current random access procedure is to be terminated, perform LBT failure recovery.

Optionally, in an embodiment, the PRACH and the PUSCH use different transmission counters, and the power ramping counter for the msgA includes the power ramping counter shared by the PRACH and the PUSCH. The sending module 202 may be configured to: if the PRACH passes LBT detection and the PUSCH fails LBT detection, send the PRACH and skip sending the PUSCH.

The processing module 204 may be configured to perform an operation of adding 1 on the power ramping counter.

Optionally, in an embodiment, the terminal device 200 further includes a receiving module, and the receiving module may be configured to:

initiate an msgB or msg2 receiving window; and if the PUSCH includes a cell-radio network temporary identifier C-RNTI media access control control element MAC CE, during operation of the msgB or msg2 receiving window, monitor a physical downlink control channel PDCCH scrambled by a random access-radio network transmission identifier RA-RNTI, and skip monitoring a PDCCH scrambled by the C-RNTI.

Optionally, in an embodiment, the sending module 202 may be configured to fall back to a 4-step random access procedure, to send the PUSCH.

Optionally, in an embodiment, the processing module 204 may be configured to: if the msgB or msg2 receiving window expires and/or contention resolution fails, perform an operation of adding 1 on the transmission counter for the PRACH, and perform an operation of adding 1 on the transmission counter for the PUSCH.

Optionally, in an embodiment, the sending module 202 may be configured to:

if at least one of the following is met, send indication information to a higher layer, where the indication information is used to indicate a random access problem:

a count on the transmission counter for the PRACH reaches a first threshold;

a count on the transmission counter for the PUSCH reaches a second threshold; or a larger one of a count on the transmission counter for the PRACH and a count on the transmission counter for the PUSCH reaches a third threshold.

Optionally, in an embodiment, the PRACH and the PUSCH use different transmission counters, and the power ramping counter for the msgA includes the power ramping counter shared by the PRACH and the PUSCH. The sending module 202 may be configured to: if the PRACH fails LBT detection and the PUSCH passes LBT detection, skip sending the PRACH, but send the PUSCH.

The processing module 204 may be configured to perform an operation of adding 1 on the power ramping counter.

Optionally, in an embodiment, the terminal device 200 further includes a receiving module, and the receiving module may be configured to:
   initiate an msgB receiving window; and
   if the msgB receiving window expires and/or contention resolution fails, suspend the transmission counter for the PRACH, and perform an operation of adding 1 on the transmission counter for the PUSCH.

Optionally, in an embodiment, the sending module 202 may be configured to: if at least one of the following is met, send indication information to a higher layer, where the indication information is used to indicate a random access problem:
   a count on the transmission counter for the PRACH reaches a first threshold;
   a count on the transmission counter for the PUSCH reaches a second threshold; or
   a larger one of a count on the transmission counter for the PRACH and a count on the transmission counter for the PUSCH reaches a third threshold.

Optionally, in an embodiment, the PRACH and the PUSCH use different transmission counters, and the power ramping counter for the msgA includes the power ramping counter shared by the PRACH and the PUSCH. The sending module 202 may be configured to: if the PRACH passes LBT detection and the PUSCH passes LBT detection, send the PRACH and the PUSCH.

The processing module 204 may be configured to perform an operation of adding 1 on the power ramping counter.

Optionally, in an embodiment, the terminal device 200 further includes a receiving module, and the receiving module may be configured to:
   initiate an msgB receiving window; and
   if the msgB receiving window expires and/or contention resolution fails, perform an operation of adding 1 on the transmission counter for the PRACH, and perform an operation of adding 1 on the transmission counter for the PUSCH.

Optionally, in an embodiment, the sending module 202 may be configured to: if at least one of the following is met, indicate a random access problem to a higher layer:
   a count on the transmission counter for the PRACH reaches a first threshold;
   a count on the transmission counter for the PUSCH reaches a second threshold; or
   a larger one of a count on the transmission counter for the PRACH and a count on the transmission counter for the PUSCH reaches a third threshold.

Optionally, in an embodiment, the transmission counter for the msgA includes the transmission counter shared by the PRACH and the PUSCH, but different power ramping counters are used. The sending module 202 may be configured to: if the PRACH fails LBT detection, skip sending the PRACH and the PUSCH.

The processing module 204 may be configured to suspend the power ramping counter for the PRACH, the power ramping counter for the PUSCH, and the transmission counter.

Optionally, in an embodiment, the transmission counter for the msgA includes the transmission counter shared by the PRACH and the PUSCH, but different power ramping counters are used. The processing module 204 may be configured to:
   if the PRACH fails LBT detection, determine, based on the number of LBT detection failures of the PRACH and/or the PUSCH, whether to terminate a current random access procedure; and
   if it is determined that the current random access procedure is to be terminated, perform LBT failure recovery.

Optionally, in an embodiment, the transmission counter for the msgA includes the transmission counter shared by the PRACH and the PUSCH, but different power ramping counters are used. The sending module 202 may be configured to: if the PRACH passes LBT detection and the PUSCH fails LBT detection, send the PRACH and skip sending the PUSCH.

The processing module 204 may be configured to: perform an operation of adding 1 on the power ramping counter for the PRACH, and suspend the power ramping counter for the PUSCH.

Optionally, in an embodiment, the terminal device 200 further includes a receiving module, and the receiving module may be configured to:
   initiate an msgB or msg2 receiving window; and
   if the PUSCH includes a C-RNTI MAC CE, during operation of the msgB or msg2 receiving window, monitor a PDCCH scrambled by an RA-RNTI, and skip monitoring a PDCCH scrambled by the C-RNTI.

Optionally, in an embodiment, the processing module 204 may be configured to: if the msgB receiving window expires and/or contention resolution fails, perform an operation of adding 1 on the transmission counter.

Optionally, in an embodiment, the transmission counter for the msgA includes the transmission counter shared by the PRACH and the PUSCH, but different power ramping counters are used. The sending module 202 may be configured to: if the PRACH fails LBT detection and the PUSCH passes LBT detection, skip sending the PRACH, but send the PUSCH.

The processing module 204 may be configured to: suspend the power ramping counter for the PRACH, and perform an operation of adding 1 on the power ramping counter for the PUSCH.

Optionally, in an embodiment, the terminal device 200 further includes a receiving module, and the receiving module may be configured to:
   initiate an msgB receiving window; and
   if the msgB receiving window expires and/or contention resolution fails, perform an operation of adding 1 on the transmission counter.

Optionally, in an embodiment, the transmission counter for the msgA includes the transmission counter shared by the PRACH and the PUSCH, but different power ramping counters are used. The sending module 202 may be configured to: if the PRACH passes LBT detection and the PUSCH passes LBT detection, send the PRACH and the PUSCH.

The processing module 204 may be configured to: perform an operation of adding 1 on the power ramping counter for the PRACH, and perform an operation of adding 1 on the power ramping counter for the PUSCH.

Optionally, in an embodiment, the terminal device 200 further includes a receiving module that may be configured to:
   initiate an msgB receiving window; and if the msgB receiving window expires and/or contention resolution fails, perform an operation of adding 1 on the transmission counter.

Optionally, in an embodiment, the PRACH and the PUSCH use different transmission counters and different power ramping counters. The sending module 202 may be configured to: if the PRACH fails LBT detection, skip sending the PRACH and the PUSCH. The processing module 204 may be configured to suspend the power ramping counter for the PRACH, suspend the power ramping counter for the PUSCH, suspend the transmission counter for the PRACH, and suspend an operation of adding 1 on the transmission counter for the PUSCH.

Optionally, in an embodiment, the PRACH and the PUSCH use different transmission counters and different power ramping counters. The processing module 204 may be configured to:

if the PRACH fails LBT detection, determine, based on the number of LBT detection failures of the PRACH and/or the PUSCH, whether to terminate a current random access procedure; and if it is determined that the current random access procedure is to be terminated, perform LBT failure recovery.

Optionally, in an embodiment, the PRACH and the PUSCH use different transmission counters and different power ramping counters. The sending module 202 may be configured to: if the PRACH passes LBT detection and the PUSCH fails LBT detection, send the PRACH and skip sending the PUSCH.

The processing module 204 may be configured to: perform an operation of adding 1 on the power ramping counter for the PRACH, and suspend the power ramping counter for the PUSCH.

Optionally, in an embodiment, the terminal device 200 further includes a receiving module, and the receiving module may be configured to:

initiate an msgB or msg2 receiving window; and if the PUSCH includes a C-RNTI MAC CE, during operation of the msgB or msg2 receiving window, monitor a PDCCH scrambled by an RA-RNTI, and skip monitoring a PDCCH scrambled by the C-RNTI.

Optionally, in an embodiment, the sending module 202 may be configured to fall back to a 4-step random access procedure, to send the PUSCH.

Optionally, in an embodiment, the processing module 204 may be configured to: if the msgB receiving window expires and/or contention resolution fails, perform an operation of adding 1 on the transmission counter for the PRACH, and perform an operation of adding 1 on the transmission counter for the PUSCH.

Optionally, in an embodiment, the sending module 202 may be configured to: if at least one of the following is met, send indication information to a higher layer, where the indication information is used to indicate a random access problem:

a count on the transmission counter for the PRACH reaches a first threshold;

a count on the transmission counter for the PUSCH reaches a second threshold; or a larger one of a count on the transmission counter for the PRACH and a count on the transmission counter for the PUSCH reaches a third threshold.

Optionally, in an embodiment, the PRACH and the PUSCH use different transmission counters and different power ramping counters. The sending module 202 may be configured to: if the PRACH fails LBT detection and the PUSCH passes LBT detection, skip sending the PRACH, but send the PUSCH.

The processing module 204 may be configured to: suspend the power ramping counter for the PRACH, and perform an operation of adding 1 on the power ramping counter for the PUSCH.

Optionally, in an embodiment, the terminal device 200 further includes a receiving module, and the receiving module may be configured to initiate an msgB receiving window.

The processing module 204 may be configured to: if the msgB receiving window expires and/or contention resolution fails, suspend the transmission counter for the PRACH, and perform an operation of adding 1 on the transmission counter for the PUSCH.

Optionally, in an embodiment, the sending module 202 may be configured to: if at least one of the following is met, send indication information to a higher layer, where the indication information is used to indicate a random access problem:

a count on the transmission counter for the PRACH reaches a first threshold;

a count on the transmission counter for the PUSCH reaches a second threshold; or a larger one of a count on the transmission counter for the PRACH and a count on the transmission counter for the PUSCH reaches a third threshold.

Optionally, in an embodiment, the PRACH and the PUSCH use different transmission counters and different power ramping counters. The sending module 202 may be configured to: if the PRACH passes LBT detection and the PUSCH passes LBT detection, send the PRACH and the PUSCH.

The processing module 204 may be configured to: perform an operation of adding 1 on the power ramping counter for the PRACH, and perform an operation of adding 1 on the power ramping counter for the PUSCH.

Optionally, in an embodiment, the processing module 204 may be configured to:

initiate an msgB receiving window; and if the msgB receiving window expires and/or contention resolution fails, perform an operation of adding 1 on the transmission counter for the PRACH, and perform an operation of adding 1 on the transmission counter for the PUSCH.

Optionally, in an embodiment, the sending module 202 may be configured to: if at least one of the following is met, indicate a random access problem to a higher layer:

a count on the transmission counter for the PRACH reaches a first threshold;

a count on the transmission counter for the PUSCH reaches a second threshold; or a larger one of a count on the transmission counter for the PRACH and a count on the transmission counter for the PUSCH reaches a third threshold.

For the terminal device 200 according to the embodiments of this disclosure, reference may be made to procedures in the method 100 in corresponding embodiments of this disclosure, and each unit or module in the terminal device 200 and the foregoing other operations and/or functions are separately intended to implement the corresponding procedures in the method 100, and can achieve the same or equivalent technical effects. For brevity, details are not described herein again.

Figure 3:
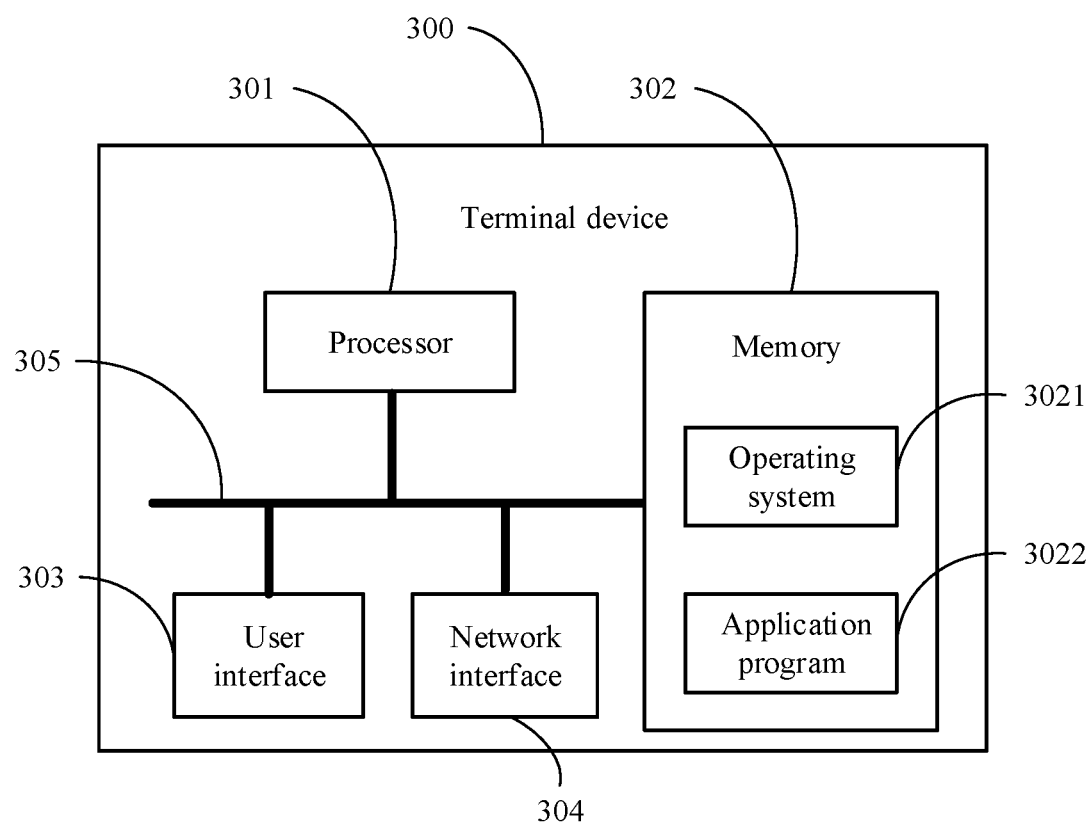
FIG. 3 is a schematic structural diagram of a terminal device according to another embodiment of this disclosure.

FIG. 3 is a block diagram of a terminal device according to another embodiment of this disclosure. The terminal device 300 shown in FIG. 3 includes at least one processor 301, a memory 302, at least one network interface 304, and a user interface 303. The components in the terminal device 300 are coupled together through a bus system 305. It may be understood that the bus system 305 is used to implement a connection and communication between these components. In addition to a data bus, the bus system 305 further includes a power bus, a control bus, and a status signal bus. However, for clarity of description, various buses are marked as the bus system 305 in FIG. 3.

The user interface 303 may include a display, a keyboard, a click device (for example, a mouse, a trackball), a touch panel, a touchscreen, or the like.

It may be understood that the memory 302 in this embodiment of this disclosure may be a volatile memory or a non-volatile memory, or may include both a volatile memory and a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), which is used as an external cache. By way of example but not restrictive description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DRRAM). The memory 302 of the system and the method described in the embodiments of this disclosure is intended to include but not be limited to these and any other applicable types of memories.

In some implementations, the memory 302 stores the following elements: an executable module or a data structure, or a subset thereof, or an extended set thereof: an operating system 3021 and an application program 3022.

The operating system 3021 includes various system programs, such as a framework layer, a core library layer, and a driver layer, for implementing various basic services and processing hardware-based tasks. The application program 3022 includes various application programs, such as a media player and a browser, which are used to implement various application services. A program for implementing the method in the embodiments of this disclosure may be included in the application program 3022.

In this embodiment of this disclosure, the terminal device 300 further includes a computer program stored in the memory 302 and capable of running on the processor 301. When being executed by the processor 301, the computer program implements the steps of the foregoing method 100.

The methods disclosed in the foregoing embodiments of this disclosure may be applied to the processor 301, or may be implemented by the processor 301. The processor 301 may be an integrated circuit chip, having a signal processing capability. During implementation, the steps of the foregoing method can be completed by hardware integrated logic circuits in the processor 301 or instructions in the form of software. The processor 301 may be a general-purpose processor, a digital signal processor (DSP), an application specific integrated circuit (ASIC), a field programmable gate array (FPGA) or another programmable logic device, a discrete gate or transistor logic device, or a discrete hardware component. The processor can implement or execute the methods, steps, and logical block diagrams disclosed in the embodiments of this disclosure. The general-purpose processor may be a microprocessor, or the processor may be any conventional processor or the like. The steps of the method disclosed with reference to the embodiments of this disclosure may be directly executed and completed by a hardware decoding processor, or executed and completed by a combination of hardware and software modules in a decoding processor. The software module may be located in a computer-readable storage medium mature in the art, such as a random access memory, a flash memory, a read-only memory, a programmable read-only memory or electrically erasable programmable memory, or a register. The computer-readable storage medium is located in the memory 302, and the processor 301 fetches information in the memory 302, and completes the steps of the foregoing method in combination with its hardware. Specifically, the computer-readable storage medium stores a computer program, and when the computer program is executed by the processor 301, the steps in the embodiments of the foregoing method 100 are implemented.

It can be understood that the embodiments described in the embodiments of this disclosure may be implemented by hardware, software, firmware, middleware, microcode, or a combination thereof. For hardware implementation, the processor may be implemented in one or more application-specific integrated circuits (ASIC), digital signal processors (DSP), digital signal processing devices (DSP Device, DSPD), programmable logic devices (PLD), field-programmable gate arrays (FPGA), general-purpose processors, controllers, microcontrollers, microprocessors, and other electronic units for performing the functions described in this disclosure, or a combination thereof.

For software implementation, the techniques described in the embodiments of this disclosure may be implemented by modules (for example, procedures or functions) that perform the functions described in the embodiments of this disclosure. Software code may be stored in the memory and executed by the processor. The memory may be implemented inside the processor or outside the processor.

The terminal device 300 is capable of implementing each process implemented by the terminal device in the foregoing embodiments, and can achieve the same or equivalent technical effects. To avoid repetition, details are not described herein again.

An embodiment of this disclosure further provides a computer-readable storage medium, where the computer readable storage medium stores a computer program. When the computer program is executed by a processor, processes of the embodiments of the foregoing method 100 are implemented, and a same technical effect can be achieved. To avoid repetition, details are not described herein again. For example, the computer-readable storage medium is a read-only memory (ROM), a random access memory (RAM), a magnetic disk, an optical disc, or the like.

It should be noted that the terms "include", "contain", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . "

does not preclude the existence of other identical elements in the process, method, article, or apparatus that includes the element.

According to the description of the foregoing implementations, a person skilled in the art can clearly understand that the method in the foregoing embodiments may be implemented by software in addition to a necessary universal hardware platform or by hardware only. In most cases, the former is a more preferred implementation. Based on such an understanding, the technical solutions of this disclosure essentially or a part thereof that contributes to related technologies may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The embodiments of this disclosure are described above with reference to the accompanying drawings, but this disclosure is not limited to the foregoing implementations. The foregoing implementations are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. A 2-step random access method for an unlicensed band, wherein the method is performed by a terminal device, and the method comprises:
    determining, based on a listen-before-talk (LBT) detection result, whether to send an msgA and whether to update a power ramping counter for the msgA, wherein the power ramping counter is used to determine transmission power for the msgA, and the msgA comprises a physical random access channel (PRACH) and a physical uplink shared channel (PUSCH); and
    determining, based on a sending status of the msgA, whether to update a transmission counter for the msgA;
    wherein the transmission counter for the msgA comprises the transmission counter for the PRACH and the transmission counter for the PUSCH, the PRACH and the PUSCH use different transmission counters, the power ramping counter for the msgA comprises the power ramping counter shared by the PRACH and the PUSCH, and the determining, based on an LBT detection result, whether to send an msgA and whether to update a power ramping counter for the msgA comprises:
    if the PRACH passes LBT detection and the PUSCH fails LBT detection,
    sending the PRACH and skipping sending the PUSCH; and
    performing an operation of adding 1 on the power ramping counter;
    wherein after the sending the PRACH, the method further comprises:
    initiating an msgB or msg2 receiving window; and
    if the PUSCH comprises a cell-radio network temporary identifier (C-RNTI) media access control control element (MAC CE),
    during operation of the msgB or msg2 receiving window, monitoring a physical downlink control channel (PDCCH) scrambled by a random access-radio network transmission identifier (RA-RNTI), and skipping monitoring a PDCCH scrambled by the C-RNTI.

2. The method according to claim 1, wherein the transmission counter for the msgA comprises the transmission counter shared by the PRACH and the PUSCH, the power ramping counter for the msgA comprises the power ramping counter shared by the PRACH and the PUSCH, and the determining, based on an LBT detection result, whether to update a power ramping counter for the msgA comprises:
    if at least one of the PRACH or the PUSCH passes LBT detection,
    performing an operation of adding 1 on the power ramping counter.

3. The method according to claim 2, wherein the determining, based on an LBT detection result, whether to send an msgA and the determining, based on a sending status of the msgA, whether to update a transmission counter for the msgA comprise:
    if the PUSCH passes LBT detection, sending the PUSCH and initiating an msgB receiving window; and
    if the msgB receiving window expires and/or contention resolution fails, performing an operation of adding 1 on the transmission counter.

4. The method according to claim 1, wherein the transmission counter for the msgA comprises a transmission counter for the PRACH and a transmission counter for the PUSCH, the PRACH and the PUSCH use different transmission counters, the power ramping counter for the msgA comprises the power ramping counter shared by the PRACH and the PUSCH, and the determining, based on an LBT detection result, whether to send an msgA and whether to update a power ramping counter for the msgA and the determining, based on a sending status of the msgA, whether to update a transmission counter for the msgA comprise:
    if the PRACH fails LBT detection,
    skipping sending the PRACH and the PUSCH; and
    suspending the power ramping counter, suspending the transmission counter for the PRACH, and suspending an operation of adding 1 on the transmission counter for the PUSCH.

5. The method according to claim 1, wherein the transmission counter for the msgA comprises the transmission counter for the PRACH and the transmission counter for the PUSCH, the PRACH and the PUSCH use different transmission counters, the power ramping counter for the msgA comprises the power ramping counter shared by the PRACH and the PUSCH, and the method further comprises:
    if the PRACH fails LBT detection,
    determining, based on the number of LBT detection failures of the PRACH and/or the PUSCH, whether to terminate a current random access procedure; and
    if it is determined that the current random access procedure is to be terminated, performing LBT failure recovery.

6. The method according to claim 1, wherein after the sending the PRACH, the method further comprises:
    falling back to a 4-step random access procedure, to send the PUSCH.

7. The method according to claim 6, wherein the determining, based on a sending status of the msgA, whether to update a transmission counter for the msgA comprises:
    if the msgB or msg2 receiving window expires and/or contention resolution fails,
    performing an operation of adding 1 on the transmission counter for the PRACH, and performing an operation of adding 1 on the transmission counter for the PUSCH.

8. The method according to claim 6, wherein the method further comprises:
if at least one of the following is met, sending indication information to a higher layer, wherein the indication information is used to indicate a random access problem:
a count on the transmission counter for the PRACH reaches a first threshold;
a count on the transmission counter for the PUSCH reaches a second threshold; or
a larger one of a count on the transmission counter for the PRACH and a count on the transmission counter for the PUSCH reaches a third threshold.

9. A non-transitory computer-readable storage medium, wherein the non-transitory computer-readable storage medium stores a program, and when the program is executed by a processor, the steps of the 2-step random access method for an unlicensed band according to claim 1 are implemented.

10. A terminal device, comprising a memory, a processor, and a program stored in the memory and capable of running on the processor, wherein the program, when being executed by the processor, causes the terminal device to perform:
determining, based on a listen-before-talk (LBT) detection result, whether to send an msgA and whether to update a power ramping counter for the msgA, wherein the power ramping counter is used to determine transmission power for the msgA, and the msgA comprises a physical random access channel (PRACH) and a physical uplink shared channel (PUSCH); and
determining, based on a sending status of the msgA, whether to update a transmission counter for the msgA;
wherein the transmission counter for the msgA comprises the transmission counter for the PRACH and the transmission counter for the PUSCH, the PRACH and the PUSCH use different transmission counters, the power ramping counter for the msgA comprises the power ramping counter shared by the PRACH and the PUSCH, and the determining, based on an LBT detection result, whether to send an msgA and whether to update a power ramping counter for the msgA comprises:
if the PRACH passes LBT detection and the PUSCH fails LBT detection,
sending the PRACH and skipping sending the PUSCH; and
performing an operation of adding 1 on the power ramping counter;
wherein after the sending the PRACH, the terminal device is further caused to perform:
initiating an msgB or msg2 receiving window; and
if the PUSCH comprises a cell-radio network temporary identifier (C-RNTI) media access control control element (MAC CE),
during operation of the msgB or msg2 receiving window, monitoring a physical downlink control channel (PDCCH) scrambled by a random access-radio network transmission identifier (RA-RNTI), and skipping monitoring a PDCCH scrambled by the C-RNTI.

11. The terminal device according to claim 10, wherein the transmission counter for the msgA comprises the transmission counter shared by the PRACH and the PUSCH, the power ramping counter for the msgA comprises the power ramping counter shared by the PRACH and the PUSCH, and the determining, based on an LBT detection result, whether to update a power ramping counter for the msgA comprises:
if at least one of the PRACH or the PUSCH passes LBT detection,
performing an operation of adding 1 on the power ramping counter.

12. The terminal device according to claim 11, wherein the determining, based on an LBT detection result, whether to send an msgA and the determining, based on a sending status of the msgA, whether to update a transmission counter for the msgA comprise:
if the PUSCH passes LBT detection, sending the PUSCH and initiating an msgB receiving window; and
if the msgB receiving window expires and/or contention resolution fails, performing an operation of adding 1 on the transmission counter.

13. The terminal device according to claim 10, wherein the transmission counter for the msgA comprises a transmission counter for the PRACH and a transmission counter for the PUSCH, the PRACH and the PUSCH use different transmission counters, the power ramping counter for the msgA comprises the power ramping counter shared by the PRACH and the PUSCH, and the determining, based on an LBT detection result, whether to send an msgA and whether to update a power ramping counter for the msgA and the determining, based on a sending status of the msgA, whether to update a transmission counter for the msgA comprise:
if the PRACH fails LBT detection,
skipping sending the PRACH and the PUSCH; and
suspending the power ramping counter, suspending the transmission counter for the PRACH, and suspending an operation of adding 1 on the transmission counter for the PUSCH.

14. The terminal device according to claim 10, wherein the transmission counter for the msgA comprises the transmission counter for the PRACH and the transmission counter for the PUSCH, the PRACH and the PUSCH use different transmission counters, the power ramping counter for the msgA comprises the power ramping counter shared by the PRACH and the PUSCH, and the program, when being executed by the processor, further causes the terminal device to perform:
if the PRACH fails LBT detection,
determining, based on the number of LBT detection failures of the PRACH and/or the PUSCH, whether to terminate a current random access procedure; and
if it is determined that the current random access procedure is to be terminated, performing LBT failure recovery.

15. The terminal device according to claim 10, wherein after the sending the PRACH, the terminal device is further caused to perform:
falling back to a 4-step random access procedure, to send the PUSCH.

16. The terminal device according to claim 15, wherein the determining, based on a sending status of the msgA, whether to update a transmission counter for the msgA comprises:
if the msgB or msg2 receiving window expires and/or contention resolution fails,
performing an operation of adding 1 on the transmission counter for the PRACH, and performing an operation of adding 1 on the transmission counter for the PUSCH.

* * * * *